US012680931B2

(12) United States Patent
Almutairi et al.

(10) Patent No.: US 12,680,931 B2
(45) Date of Patent: Jul. 14, 2026

(54) DEVICE TO STANDARDIZE LABORATORY AIR-PARTICLE ABRASION TESTING

(71) Applicant: Imam Abdulrahman Bin Faisal University, Dammam (SA)

(72) Inventors: Reem Mohsen Almutairi, Riyadh (SA); Sarah Mohammed Alnafaiy, Riyadh (SA); Ahmad Maniallah Al-Thobity, Dammam (SA)

(73) Assignee: Imam Abdulrahman Bin Faisal University, Dammam (SA)

( * ) Notice: Subject to any disclaimer, the term of this patent is extended or adjusted under 35 U.S.C. 154(b) by 581 days.

(21) Appl. No.: 18/323,776

(22) Filed: May 25, 2023

(65) Prior Publication Data

US 2024/0393217 A1 Nov. 28, 2024

(51) Int. Cl.
| | |
|---|---|
| *G01N 3/56* | (2006.01) |
| *G01N 3/02* | (2006.01) |
| *G01N 3/04* | (2006.01) |

(52) U.S. Cl.
CPC .............. *G01N 3/565* (2013.01); *G01N 3/02* (2013.01); *G01N 3/04* (2013.01); *G01N 3/56* (2013.01)

(58) Field of Classification Search
CPC .. G01N 3/02; G01N 3/04; G01N 3/56; G01N 3/565; A61C 19/04
See application file for complete search history.

(56) References Cited

U.S. PATENT DOCUMENTS

| | | | | | |
|---|---|---|---|---|---|
| 3,929,001 | A | * | 12/1975 | Lee | ........................... G01N 3/56 |
| | | | | | 73/7 |
| 9,969,056 | B2 | | 5/2018 | Yang et al. | |

FOREIGN PATENT DOCUMENTS

| | | | | |
|---|---|---|---|---|
| CN | 102248492 | A | 11/2011 | |
| CN | 107116480 | A | 9/2017 | |
| CN | 110308064 | A * | 10/2019 | ............... G01N 3/56 |
| CN | 112763308 | A * | 5/2021 | .............. B25J 17/00 |
| CN | 113945476 | A * | 1/2022 | .............. G01N 3/56 |
| CN | 216179673 | U | 4/2022 | |
| CN | 113714941 | B | 8/2022 | |
| CN | 115200984 | A * | 10/2022 | ............ G01M 13/04 |
| KR | 102110169 | B1 * | 5/2020 | ............... G01N 3/56 |

* cited by examiner

*Primary Examiner* — Jill E Culler
(74) *Attorney, Agent, or Firm* — Oblon, McClelland, Maier & Neustadt, L.L.P.

(57) ABSTRACT

A device to standardize laboratory air-particle abrasion testing includes a specimen section and a handpiece section, each located on ends of a platform. The specimen section includes a specimen metal table, a specimen metal plate, a metal clamp, a clamp locknut, and a horizontal arm that connects the specimen metal table to the specimen metal plate. The clamp locknut tightens the metal clamp around a specimen, and the metal clamp holds the specimen on the specimen metal table. The handpiece section includes a vertical arm and an abrasion handpiece. The abrasion handpiece extends through an aperture in the vertical arm and an abrasion handpiece holding screw surrounds a circumference of the abrasion handpiece so that the abrasion handpiece is fixed longitudinally when extending through the aperture in the vertical arm.

18 Claims, 3 Drawing Sheets

DEVICE TO STANDARDIZE LABORATORY AIR-PARTICLE ABRASION TESTING

BACKGROUND

Technical Field

The present disclosure relates to a dental material device and more particularly relates to fabrication of device that supports dental material specimens during laboratory air-particle abrasion procedures.

Discussion of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Dental restoration techniques are used to restore a tooth surfaces. For example, a crown is a dental restoration that is used to restore a single tooth. A bridge is an example of a dental restoration that restores multiple teeth. In some circumstances, dental restorations are used to restore functionality after a tooth is damaged. In other circumstances, dental restorations are used to aesthetically improve a patient's teeth. The two types of dental restoration used most often are direct restoration and indirect restoration. Indirect restorations are fabricated by a dental tab, such as crowns, bridges, veneers, and inlays.

Fractures have been shown to be one of the most significant complications of indirect dental restorations. Thus, preventing fractures may be crucial for clinical survival of indirect restorations. Successful adhesive cementation of indirect restorations may eliminate the risk of fractures. In this regard, good bond strength between the restoration and cement is needed to improve fracture resistance. To achieve a strong bond between the cement and indirect restorative materials, mechanical or chemical pre-treatments are important. The most common mechanical pre-treatment method with dental materials is sandblasting or airborne-particle abrasion. Airborne-particle abrasion involves spraying abrasive particles onto the indirect restorative materials at a certain pressure to cut or abrade a surface of the indirect restorative materials, thereby creating a roughened surface. Such roughness increases a total surface area of the surface of the indirect restorative material, thereby allowing interlocking between the indirect restoration material and the cement.

Typically, dental laboratories us airborne-particle abrasion machines to roughen the surface of indirect restorations, and perform various other procedures associated with laboratory work. Most laboratory airborne-particle abrasion machines include an abrasion handpiece that has a nozzle from which abrasive particles are ejected. A distance between a tip of the abrasion handpiece and a dental surface is an important factor in cutting and abrasion efficiency. An angulation of the abrasion handpiece to the dental surface also effects the cutting and abrasion efficiency. Conventionally, the abrasion handpiece is manipulated manually by an operator to abrade the surface of the indirect restoration. However, each dental material has a specific recommended distance from the tip of the abrasive handpiece and corresponding angulation to achieve efficient cutting. Dental research has shown that the distance between the tip of the abrasion handpiece and a dental specimen, and angulation, should be fixed for each group of specimens to standardize testing and eliminate human error that may be inherent during manual process.

Accordingly, it is one object of the present disclosure to provide a device that helps fix the position of the abrasion handpiece and the dental specimen during testing.

SUMMARY

According to one aspect of the present disclosure, a device to standardize laboratory air-particle abrasion testing is provided. The device includes a specimen section and a handpiece section. The specimen section includes a specimen metal table, a specimen metal plate, a metal clamp, a horizontal arm, and a clamp locknut. The specimen metal table is fixedly attached to the specimen metal plate by the horizontal arm. The clamp locknut is configured to tighten the metal clamp around a specimen, and the metal clamp is configured to hold the specimen on the specimen metal table. The handpiece section includes a vertical arm and an abrasion handpiece with an abrasion handpiece holding screw. A metal platform connects the handpiece section with the specimen section, so that the vertical arm of the handpiece section is mounted on a first end of the metal platform and the horizontal arm of the specimen section is located opposite the first end of the metal platform at a second end. The abrasion handpiece is configured to extend through an aperture in the vertical arm to the specimen metal table. The abrasion handpiece holding screw surrounds a circumference of the abrasion handpiece so that the abrasion handpiece is fixed longitudinally when extending through the aperture in the vertical arm.

In some embodiments, the abrasion handpiece holding screw includes a metal bracket, a metal ring, a screw, and screw locknut. The screw extends through holes from one end of the metal bracket to a second end of the metal bracket. The metal ring is mounted within the metal bracket to allow the screw to pass through a first hole proximal to the first end of the metal bracket to a second hole proximal to the second end of the metal bracket. The screw locknut holds the screw in place at the second end of the metal bracket.

In some embodiments, the specimen metal table further includes a flat rectangular depression for specimen placement. In some embodiments, the flat rectangular depression has a length ranging from 2 millimeters (mm) to 20 mm.

In some embodiments, the abrasion handpiece is configured to rotate 180 degrees through the aperture of the vertical arm relative to the specimen in the specimen metal table.

In some embodiments, the metal ring is configured to rotate 180 degrees within the metal bracket.

In some embodiments, the specimen section includes at least 4 clamp locknuts.

In some embodiments, the specimen section includes at least 4 metal clamps.

In some embodiments, the specimen metal table has a substantially square surface. In some embodiments, an individual clamp locknut is disposed equidistant between adjacent corners of the square specimen metal table.

In some embodiments, each of the vertical arm and the horizontal arm is a hollow cylindrical body. The vertical arm is configured to allow the abrasion handpiece to extend through the hollow cylindrical body.

In some embodiments, the cylindrical vertical arm has a first diameter, and the cylindrical horizontal arm has a second diameter. In some embodiments, the first diameter is equal to the second diameter.

In some embodiments, the second diameter is 1.1 to 1.3 times greater than the first diameter. In some embodiments, the first diameter is 1.1 to 1.3 times greater than the second diameter.

In some embodiments, each of the metal platform and the metal bracket is made of steel. In some embodiments, the metal platform is substantially rectangular.

In some embodiments, the specimen metal table is made of at least one metal selected from the group consisting of steel, iron, aluminum, titanium, nickel, and carbon steel.

In some embodiments, the metal ring is made of at least one metal selected from the group consisting of steel, iron, aluminum, titanium, nickel, and carbon steel.

These and other aspects of non-limiting embodiments of the present disclosure will become apparent to those skilled in the art upon review of the following description of specific non-limiting embodiments of the disclosure in conjunction with the accompanying drawings.

BRIEF DESCRIPTION OF THE DRAWINGS

A better understanding of embodiments of the present disclosure (including alternatives and/or variations thereof) may be obtained with reference to the detailed description of the embodiments along with the following drawings, in which.

DETAILED DESCRIPTION

Figure 1:
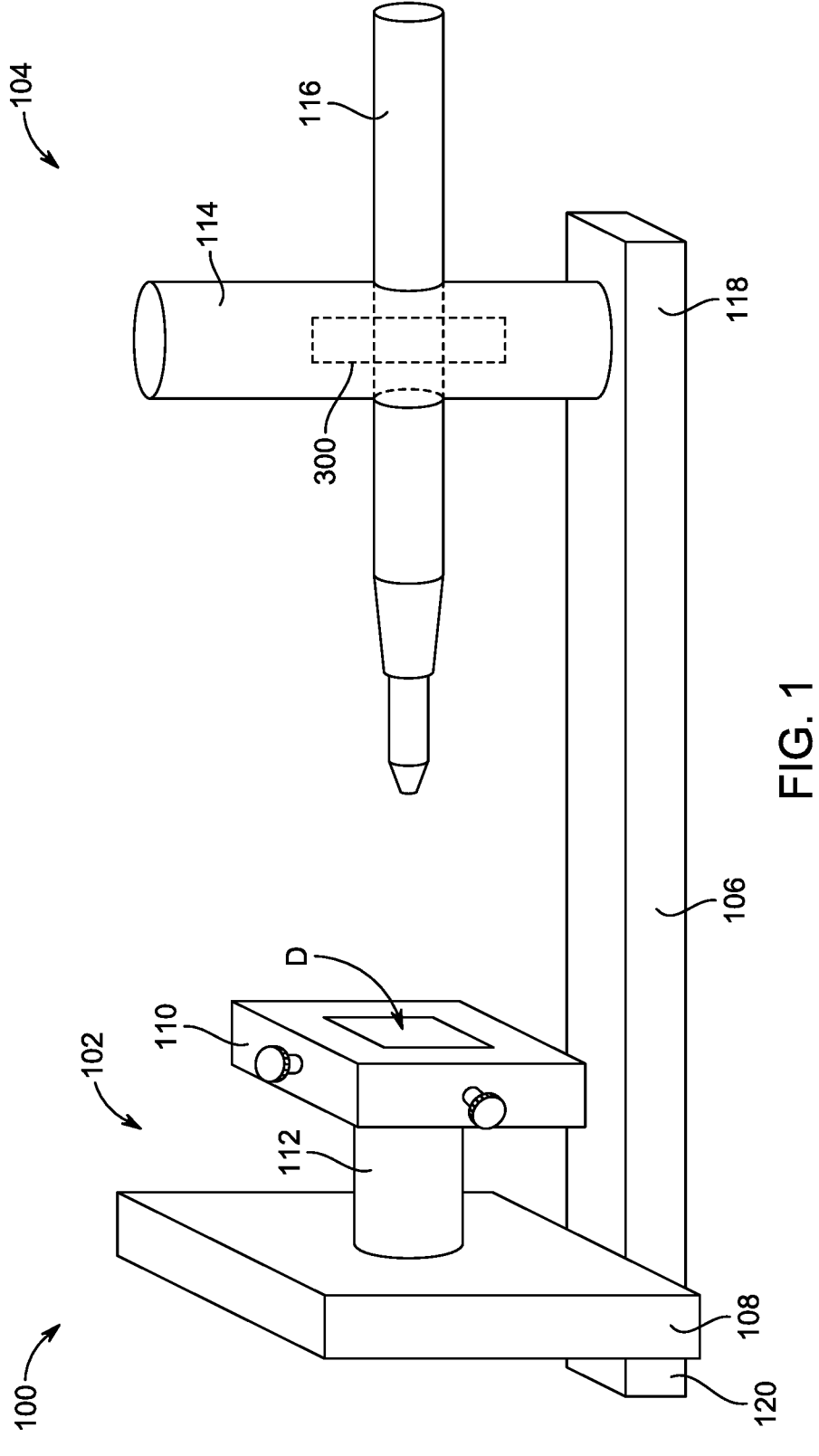
FIG. 1 illustrates an exemplary device to for laboratory air-particle abrasion, according to an aspect of the present disclosure.

In the following description, it is understood that other embodiments may be utilized, and structural and operational changes may be made without departure from the scope of the present embodiments disclosed herein.

Reference will now be made in detail to specific embodiments or features, examples of which are illustrated in the accompanying drawings. Wherever possible, corresponding, or similar reference numbers will be used throughout the drawings to refer to the same or corresponding parts. Moreover, references to various elements described herein, are made collectively or individually when there may be more than one element of the same type. However, such references are merely exemplary in nature. It may be noted that any reference to elements in the singular may also be construed to relate to the plural and vice-versa without limiting the scope of the disclosure to the exact number or type of such elements unless set forth explicitly in the appended claims.

In the drawings, like reference numerals designate identical or corresponding parts throughout the several views. Further, as used herein, the words "a," "an" and the like generally carry a meaning of "one or more," unless stated otherwise.

As used herein, the terms "a" and "an" and the like carry the meaning of "one or more."

Furthermore, the terms "approximately," "approximate," "about," and similar terms generally refer to ranges that include the identified value within a margin of 20%, 10%, or preferably 5%, and any values therebetween.

FIG. 1 illustrates an exemplary device 100 used to standardize laboratory air-particle abrasion testing, according to an embodiment of the present disclosure. The device 100 includes a specimen section 102, a handpiece section 104, and a metal platform 106 that connects the specimen section 102 with the handpiece section 104. As such, the specimen section 102 is located distant from the handpiece section 104. In some embodiments, the specimen section 102 is separated from the handpiece section 14 by from 200 to 1000 mm, preferably from 300 to 900 mm, preferably from 400 to 800 mm, preferably from 500 to 700 mm, or 600 mm. In some embodiments, the metal platform 106 is substantially rectangular and may be made of, but not limited to, steel, carbon steel, iron, nickel, aluminum, copper, tin, silver, titanium, or a combination of the like. In an embodiment, a length of the metal platform 106 is from 10 to 50 times a width of the metal platform 106, preferably from 15 to 45 times the width, preferably from 20 to 40 times the width, preferably from 25 to 35 times the width, or 30 times the width of the metal platform 106. The specimen section 102 is configured to house one or more specimens, for example a dental specimen, and the handpiece section 104 is configured to house an air abrasion system or an air abrasion handpiece.

The specimen section 102 includes a specimen metal plate 108 and a specimen metal table 110 attached to the specimen metal plate 108 via a horizontal arm 112. In some embodiments, the specimen metal plate 108 has a substantially square surface and may be made of at least one metal selected from the group consisting of steel, iron, aluminum, titanium, nickel, tin, silver, and carbon steel. In some embodiments, the specimen metal table 110 has a substantially square surface and may be made of at least one metal selected from the group consisting of steel, iron, aluminum, titanium, nickel, tin, silver, and carbon steel. In some embodiments, a length of one side of the square specimen metal plate 108 is from 1.2 to 2 times greater than a length of one side of the square specimen metal table 110, preferably from 1.4 to 1.8 times greater, or 1.6 times greater. The specimen metal table 110 defines a depression "D", for example a flat rectangular depression, to receive a specimen "S" (see FIG. 2). In some embodiments, the flat rectangular depression D may have a length (or depth) in a range of from 2 millimeters (mm) to about 20 mm, preferably from 4 to 18 mm, preferably from 6 to 16 mm, preferably from 8 to 14 mm, preferably from 10 to 12 mm, or 11 mm. In a preferred embodiment, the depth of the flat rectangular depression may be about 3 mm. In some embodiments, the depression "D" defined in the specimen metal table 110 may be of a shape corresponding to shape of the specimen "S", such that the specimen may be easily mounted on the specimen metal table 110. In an embodiment, the length of the metal platform 106 is from 1.5 to 4 times greater than a length of the horizontal arm 112, preferably from 2 to 3 times greater, or 2.5 times greater. In an embodiment, the horizontal arm 112 has a substantially cylindrical shape and may be made of at least one metal selected from the group consisting of steel, iron, aluminum, titanium, nickel, tin, silver, and carbon steel. In an embodiment, each of the specimen metal plate 108, the specimen metal table 110, and the horizontal arm 112 are fabricated of the same metal. In an embodiment, each of the specimen metal plate 108, the specimen metal table 110, and the horizontal arm 112 are fabricated of a different metal. In an embodiment, the horizontal arm 112 is formed integral with both the specimen metal plate 108 and the specimen metal table 110. In an embodiment, the horizontal arm 112 is formed integral with the specimen metal plate 108 only and is removable from the specimen metal table 110 via a fastening mean, such as a screw, a binge, a clasp, and a hook.

The handpiece section 104 includes a vertical arm 114 and an abrasion handpiece 116 inserted through the vertical arm 114. The vertical arm 114 is embodied as a hollow cylindrical body configured to allow the abrasion handpiece 116 to extend therethrough. In an embodiment, the vertical arm 114 has a substantially cylindrical shape and may be made of at least one metal selected from the group consisting of steel, iron, aluminum, titanium, nickel, tin, silver, and carbon steel. In an embodiment, a diameter of the vertical arm 114 is equal to a diameter of the horizontal arm 112. In an embodiment, a diameter of the vertical arm 114 is from 1.1 to 1.3 times greater than the diameter of the horizontal arm 112, preferably 1.2 times greater. In an embodiment, a diameter of the horizontal arm 112 is from 1.1 to 1.3 times greater than the diameter of the vertical arm 114, preferably 1.2 times greater. In an embodiment, the vertical arm 114 defines an aperture, with an abrasion handpiece holding screw 300 (see FIG. 3), to allow insertion of the abrasion handpiece 116 therethrough. Although the aperture is not explicitly referenced with a numeral in FIG. 1, it will be understood to a person in the art about various means of inserting or coupling the abrasion handpiece 116 to the vertical arm 114. In an embodiment, the diameter of the vertical arm 114 is from 1.1 to 1.5 times greater than a diameter of the aperture in the vertical arm 114, preferably from 1.2 to 1.4 times greater, or 1.2 times greater. Particularly, because of a hollow cylindrical structure, the vertical arm 114 defines a pair of holes (not explicitly referenced), where one hole is aligned with the other along a diameter of the hollow cylindrical structure. Such alignment helps to easily insert the abrasion handpiece 116 through the vertical arm 114 via the holes. In an embodiment, there are between 2 and 6 pairs of holes, preferably 4 pairs of holes. In an embodiment, the abrasion handpiece 116 may be made of at least one metal selected from the group consisting of steel, iron, aluminum, titanium, nickel, tin, silver, and carbon steel. In an embodiment, the abrasion handpiece 116 has a nozzle disposed at a first end of the abrasion handpiece 116, defined as the end facing the specimen metal table 110. In an embodiment, the nozzle is removable from the abrasion handpiece.

Further, the vertical arm 114 is mounted at a first end 118 of the metal platform 106 and the specimen metal plate 108 (or, the horizontal arm) is mounted at a second end 120 of the metal platform 106. As such, the vertical arm 114 is located distant from the specimen metal table 110. The holes or apertures defined in the vertical arm 114 are aligned with the depression "D" defined in the specimen metal table 110, so that, in an inserted condition, the abrasion handpiece 116 is oriented towards the depression "D". In some embodiments, the vertical arm 114 may be rotatably fixed at the first end 118 of the metal platform 106 and the rotation may be arrested (or the vertical arm 114 may be locked) when the vertical arm 114 reaches a desired angular orientation. In an embodiment, the specimen metal plate 108 is fixed in place at the second end 120 of the metal platform 106. In an embodiment, the specimen metal plate 108 is welded to the second end 120 of the metal platform 106. In an embodiment, the vertical arm 114 extends to a first height at the first end 118 relative to the metal platform 106 and the specimen metal plate 108 extends to a second height at the second end 120 relative to the metal platform 106. In an embodiment, the first height is equal to the second height, that is the vertical arm 114 and the specimen metal plate 108 extend to a same height above the metal platform 106. In an embodiment, the first height is from 1.1 to 1.3 times greater than the second height, preferably 1.2 times greater. In an embodiment, the second height is from 1.1 to 1.3 times greater than the first height, preferably 1.2 times greater. For example, while configuring the device 100, the holes or apertures defined in the vertical arm 114 need not be aligned with the depression "D" defined in the specimen metal table 110. Once the abrasion handpiece 116 is inserted through the vertical arm 114, orientation of the abrasion handpiece 116 may be adjusted with respect to the depression "D" defined in the specimen metal table 110 by rotating the vertical arm 114 and then the vertical arm 114 may be locked in position. As such, once the specimen "S" is mounted to the specimen metal table 110, the abrasion handpiece 116 may be oriented towards the specimen "S" (see FIG. 2).

Preferably a scale plate is mounted on the surface of the specimen plate 108 interposed between the surface of the specimen plate 108 and the horizontal arm 112. The horizontal arm 112 is mounted to the specimen plate through a rotating mechanism such as a screw. A single mark on the outer surface of the horizontal line provides a reference point from which to measure the angle at which the specimen metal table 110 is rotated. The specimen metal plate 108 is preferably slidably mounted onto the metal platform 106. The upper surface of the metal platform 106 has a linear scale from which to measure a distance between the specimen section 102 and the handpiece section 104.

Likewise, a scale plate is preferably mounted between the bottom face of the vertical arm 114 and the top surface of the platform 106. The vertical arm is attached to the platform 106 by a rotatable mechanism permitting the angle of the entire handpiece section 104 to be rotated about an axis of the vertical arm 114. The vertical arm 114 is preferably a telescoping extension such that the height of 114 is adjustable and permits raising and lowering the height of the abrasion hand piece 116 relative to the specimen metal table 110 and the platform 106. The distance of the abrasion handpiece 116 at its closest frontmost portion (for example the tip which holds an abrasive surface and/or includes an exit port for ejecting abrasive materials) to the surface of the depression (D) in the specimen metal table 110 is further adjustable by advancing or retracting the abrasion handpiece 116 through the aperture of the vertical arm 114.

The abrasion handpiece 116 preferably includes a back portion behind the vertical arm 114 and a front portion in front of the vertical arm 114 and oriented towards the specimen section 102. The front portion, alternately referred as the tip, faces the specimen section 102 and functions as the abrasively functional portion of the abrasion handpiece. In a further preferred embodiment (not showing in FIG. 1) a shroud is mounted around the front portion of the abrasion handpiece 116. The shroud is in the shape of a cone having a smallest diameter matching a diameter of an extension portion of a body or the tip of the abrasion handpiece 116. The cone extends outwardly from the abrasion handpiece 116 towards the specimen section 102 and functions to permit directing an abrasive material ejected from the tip of the abrasion handpiece 116 towards the indented surface of the specimen metal table 110. In a preferred embodiment a bellows connects the front face of the specimen metal table 110 with the body portion of the abrasion handpiece 116 on an inner side of the abrasion handpiece 116 of the vertical arm 114 facing the specimen section 102. The bellows section effectively captures abrasive materials ejected from the tip of the abrasion handpiece 116 thereby avoiding their dispersal in a laboratory environment.

The abrasion handpiece 116, in a preferable embodiment, is a hollow cylindrical tube capable of passing an airflow carrying suspended abrasive particles from a back portion to a front portion of the abrasion handpiece to directing the abrasive particles and the gas flow towards the front surface of the specimen metal table 110. In a related embodiment specimen metal table 110 includes an L-shaped extension protruding from a front surface facing the abrasion section 104. The longer portions of the L shape extend forwardly perpendicular to the plane of the specimen metal table 110 and axially parallel to the center axis of the abrasion handpiece 116 and/or the horizontal arm 112. The bottom portion of the L-shaped extension faces inwardly towards a centerpoint of the specimen metal table 110. In this fashion the extensions form a rim defining an annular space at the edge of the specimen metal table. The annular space functions to capture abrasive materials ejected from the abrasion handpiece 116 after impacting the specimen metal table 110 or a specimen mounted thereon.

In some embodiments, the horizontal arm 112 of the specimen section 102 may also be implemented as a hollow cylindrical body. The vertical arm 114 may have a first diameter and the horizontal arm 112 may have a second diameter. In some embodiments, the first diameter may be equal to the second diameter. In some embodiments, the first diameter may be 1.1 to 1.3 times greater than the second diameter, preferably 1.2 times greater than second diameter. In some embodiments, the second diameter may be 1.1 to 1.3 times greater than the first diameter, preferably 1.2 times greater than the first diameter.

Figure 2:
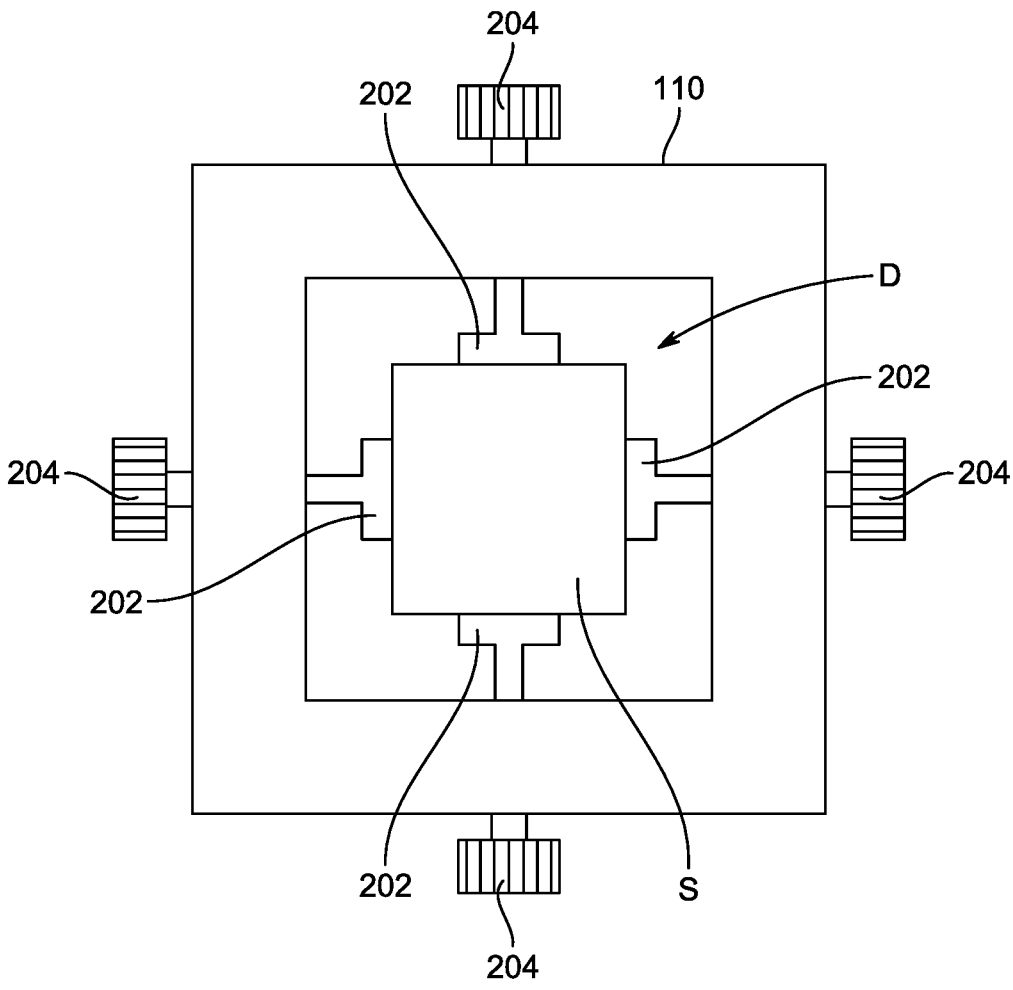
FIG. 2 illustrates an enlarged view of a specimen metal table of the device of FIG. 1, according to an aspect of the present disclosure.

FIG. 2 illustrates an enlarged view of the specimen metal table 110, according to an embodiment of the present disclosure. The specimen "S" may be mounted on the specimen metal table 110 using multiple fixtures or fasteners. The device 100 includes multiple metal clamps 202 and multiple clamp locknut 204. As described earlier, the specimen metal table 110 preferably has a substantially square surface. In such configuration, four clamp locknuts 204 may be provided along a periphery of the specimen metal table 110. In some embodiments, one clamp locknut 204 may be provided on each side of the specimen metal table 110. In some embodiments, an individual clamp locknut 204 is disposed equidistant between adjacent corners of the square specimen metal table 110. In an embodiment, there are 2 clamp locknuts 204 between adjacent corners of the square specimen table 110, so that there are 8 total clamp locknuts 204. In such a case, there is also one metal clamp 202 for each individual clamp locknut 204, totaling 8 metal clamps 202. In an embodiment, the metal clamp 202 may be made of at least one metal selected from the group consisting of steel, iron, aluminum, titanium, nickel, tin, silver, and carbon steel. In an embodiment, the clamp locknuts 204 may be made of at least one metal selected from the group consisting of steel, iron, aluminum, titanium, nickel, tin, silver, and carbon steel.

The clamp locknuts 204 are configured to tighten the metal clamps 202 around the specimen "S". The metal clamps 202 are configured to hold the specimen "S" on the specimen metal table 110. In arrangement, each metal clamp 202 is disposed corresponding to one clamp lockout 204 as show in FIG. 2. In some embodiments, rotation of the clamp locknuts 204 pushes the corresponding metal clamps 202 in a direction towards the specimen "S". As such, by simultaneously operating two clamp locknuts 204 at a time, the specimen "S" may be held in position within the depression "D" defined on the specimen metal table 110.

Figure 3:
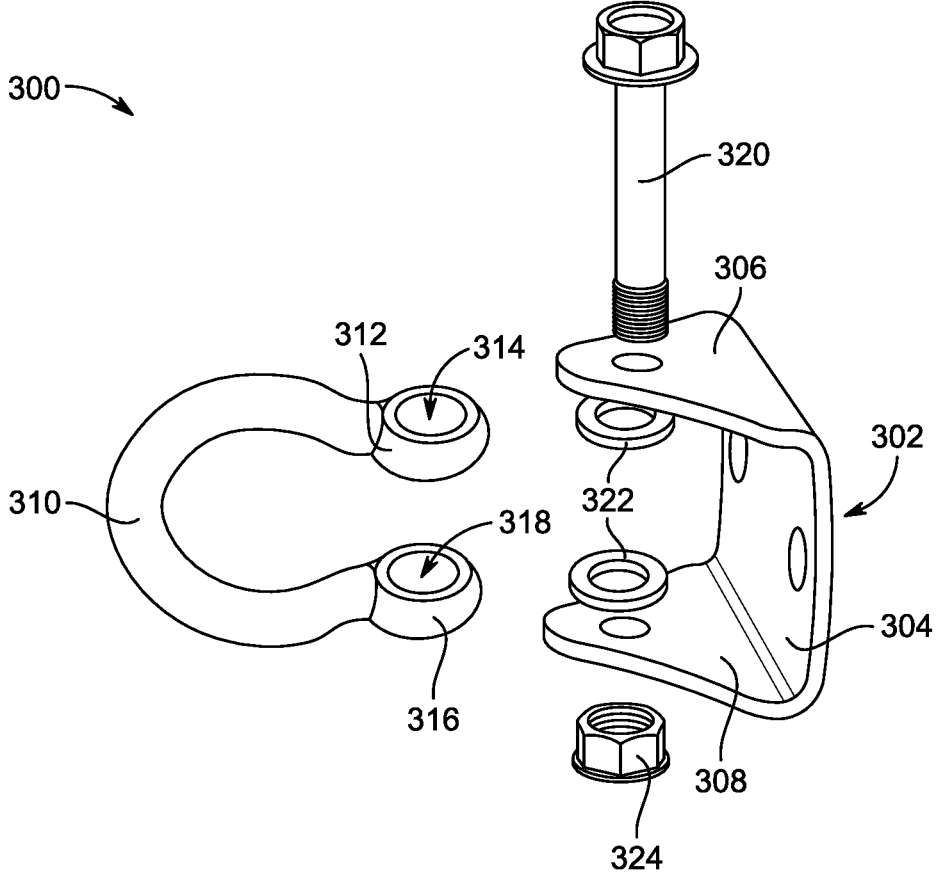
FIG. 3 illustrates an abrasion handpiece holding screw of the device of FIG. 1, according to an aspect of the present disclosure.

FIG. 3 illustrates an exemplary abrasion handpiece holding screw 300. According to an embodiment of the present disclosure, the abrasion handpiece 116 is held with one or more fixtures located within the vertical arm 114. As described earlier, the vertical arm 114 may be embodied as a hollow cylindrical body. As such, the one or more fixtures may be disposed within the hollow cylindrical body and may be configured to hold the abrasion handpiece 116 in position. In an embodiment, the fixtures are plastic rings and there are from 2 to 12 plastic rings disposed within the hollow cylindrical body, preferably 4 to 10, preferably 6 to 8, or 7 plastic rings. In an embodiment, the plastic rings are made of polyvinyl chloride (PVC). In an embodiment, the PVC rings are disposed concentrically to one another relative to a diameter of the vertical arm 114. In an embodiment, the PVC rings are only present in the vertical arm in a small section of the vertical arm 114 where the abrasion handpiece 116 is configured to move through. In an embodiment, the PVC rings extend through a length that is 0.1 to 0.3 times the total length of the vertical arm 114, preferably 0.2 times the length. The total length of the vertical arm 116, as depicted in FIG. 1, starts from the vertical arm 114 point of contact with the metal platform 106 and extends upward to the upper cylindrical surface of the vertical arm 114. Preferably, the abrasion handpiece 116 is supported in the vertical arm 114 with aid of the abrasion handpiece holding screw 300, where the abrasion handpiece holding screw 300 surrounds a circumference of the abrasion handpiece 116 so that the abrasion handpiece 116 is fixed longitudinally when extending through the aperture in the vertical arm 114.

In an embodiment, the abrasion handpiece holding screw 300 includes a metal bracket 302 made of, for example, steel, silver, tin, iron, aluminum, titanium, nickel, or carbon steel. The metal bracket 302 includes a central portion 304, a first arm 306 extending perpendicular from one end of the central portion 304, and a second arm 308 extending perpendicular from another end of the central portion 304. In an embodiment, the central portion 304 includes two central holes configured to provide the metal bracket 302 with stability. In an embodiment, the central portion 304 is made of, for example, steel, silver, tin, iron, aluminum, titanium, nickel, or carbon steel. In an embodiment, the first arm 306 and the second arm 308 are made of, for example, steel, silver, tin, iron, aluminum, titanium, nickel, or carbon steel. In an embodiment, the first arm 306 and the second arm 308 are in the shape of a triangle. In an embodiment, a length of the central portion 304 is from 1.1 to 1.5 times greater than a length of the first arm 306, preferably 1.2 to 1.4 times greater, or 1.3 times greater. In an embodiment, a length of the central portion 304 is from 1.1 to 1.5 times greater than a length of the second arm 308, preferably 1.2 to 1.4 times greater, or 1.3 times greater. In an embodiment, the length of the first arm 306 is equal to the length of the second arm 308. As such, the metal bracket 302 is embodied as a C-shaped clamp. The metal bracket 302 is disposed in the vertical arm 114 such that the central portion 304 is aligned with the central axis of the vertical arm 114. That is, the central portion 304 of the metal bracket 302 is disposed perpendicular to the metal platform 106 in an assembled condition of the metal bracket 302 with respect to the vertical arm 114. Each of the first arm 306 and the second arm 308 of the metal bracket 302 defines a hole, where the hole on the first arm 306 is aligned with the hole on the second arm 308. In an embodiment, the hole for the first arm 306 has a first diameter that is equal to a second diameter of the hole for the second arm 308. In an embodiment, the diameter of the apertures in the central portion 304 are from 1.1 to 1.3 times greater than each of the first diameter and the second diameter, preferably 1.2 times greater.

The abrasion handpiece holding screw 300 further includes a metal ring 310 made of at least one metal selected from the group consisting of steel, iron aluminum, titanium, nickel, and carbon steel. In an embodiment, the metal ring 310 is embodied with a C-shape. The metal ring 310 includes a first extension 312 defining a first hole 314 at an end thereof and a second extension 316 defining a second hole 318 at an end thereof. In an embodiment, the first extension 312 and the second extension 316 have a circular shape. In an embodiment, the first extension 312 and the second extension 316 are fabricated of steel, iron aluminum, titanium, nickel, or carbon steel. In an embodiment, the first hole 314 has a first diameter that is equal to a second diameter of the second hole 318. In an embodiment, the first and second diameter for the first hole 314 and second hole 318 respectively, is from 1.25 to 3 times greater than the first diameter of the hole for the first arm 306 and the second diameter for the second arm 308 respectively, preferably from 1.5 to 2.5 times greater, or 2 times greater. In an embodiment, a distance between the ends of the first extension 312 and the second extension 316 is less than a distance between the first arm 306 and the second arm 308 of the metal bracket 302, preferably 0.7 to 0.9 times the distance between the first arm 306 and the second arm 308, or 0.8 times the distance. As such, the ends of the first extension 312 and the second extension 316 may be aligned with the first arm 306 and the second arm 308 of the metal bracket 302, such that the first hole 314 of the first extension 312 is aligned with the hole defined in the first arm 306 and the second hole 318 of the second extension 316 is aligned with the hole defined in the second arm 308.

The abrasion handpiece holding screw 300 further includes a screw 320 configured to extend through the holes of the metal bracket 302 and the metal ring 310. In an embodiment, the screw 320 is fabricated of steel, iron aluminum, titanium, nickel, or carbon steel. In some embodiments, washers 322 may be provided to prevent friction between the ends of the extensions of the metal ring 310 and the arms of the metal bracket 302. In an embodiment, the washers 322 are fabricated of steel, iron aluminum, titanium, nickel, or carbon steel. In an embodiment, the shape of the washers 322 may be circular, hexagonal, octagonal, or any other polygonal shape. A screw locknut 324 is configured to thread with the screw 320 and hold the screw 320 in place at the second arm 308 of the metal bracket 302. In an embodiment, the screw locknut 324 is fabricated of steel, iron aluminum, titanium, nickel, or carbon steel. In an embodiment, the shape of the screw locknut 324 may be circular, hexagonal, octagonal, or any other polygonal shape. With such construction of the abrasion handpiece holding screw 300, the metal ring 310 is configured to rotate 180 degrees within the metal bracket 302. Since the abrasion handpiece 116 extends through the metal ring 310, the abrasion handpiece 116 is also allowed to rotate for 180 degrees. As such, an operator handling the device 100 may note an angulation orientation of the abrasion handpiece 116 with respect to the specimen "S". It will be understood by the person skilled in the art that the aperture or the holes defined in the vertical arm 114 may have a length extending along the circumference of the vertical arm 114 to allow 180 degrees swivel rotation of the abrasion handpiece 116. As such, the abrasion handpiece 116 may be oriented and positioned with respect to the specimen "S" mounted on the specimen metal table 110. In some embodiments, the device 100 may include electrical and mechanical components, such as control unit and gears, configured to automatically adjust the distance and angulation between the abrasion handpiece 116 and the specimen "S".

To this end, the present disclosure provides the device 100 that can standardize the laboratory airborne-particle abrasion procedure in dental research by fixing the distance and angulation of the abrasion handpiece to the specimen "S", as both play a role in the cutting efficiency. The device 100 may reduce human error which otherwise occurs during manual abrasion procedure.

Numerous modifications and variations of the present invention are possible in light of the above teachings. It is, therefore, to be understood that, within the scope of the appended claims, the invention may be practiced otherwise than as specifically described herein.

The invention claimed is:

1. An air particle abrasion testing device, comprising:
    a platform, a specimen section and a handpiece section, wherein the handpiece section and the specimen section are mounted at opposing ends of an upper surface of the platform;
    wherein the specimen section includes:
        a specimen metal table;
        a specimen metal plate;
        a metal clamp;
        a horizontal arm; and
        a clamp locknut;
        wherein the specimen metal table is attached to the specimen metal plate by the horizontal arm;
        wherein the clamp locknut is configured to tighten the metal clamp around a specimen, and the metal clamp is configured to hold the specimen on the specimen metal table; and
    wherein the handpiece section includes:
        an abrasion handpiece with an abrasion handpiece holding screw; and
        a vertical arm connected to the platform;
        wherein the abrasion handpiece extends through an aperture in the vertical arm and is configured to extend towards the specimen table;
        the abrasion handpiece holding screw surrounds a major portion of a circumference of the abrasion handpiece to secure the abrasion handpiece through the aperture in the vertical arm; and
        a cone-shaped bellows having truncated tip circumferentially surrounding a front portion of the abrasion handpiece and extending towards the specimen table and having a bottom portion attached to a perimeter of the specimen table.

2. The device of claim 1, wherein the abrasion handpiece holding screw comprises a metal bracket, a metal ring, a screw, and a screw locknut;
    wherein the screw extends through holes from one end of the metal bracket to a second end of the metal bracket; and
    the metal ring is mounted within the metal bracket to allow the screw to pass through a first hole proximal to the first end of the metal bracket to a second hole proximal to the second end of the metal bracket; and
    the screw locknut holds the screw in place at the second end of the metal bracket.

3. The device of claim 2, wherein the metal bracket is made of steel.

4. The device of claim 2, wherein the metal ring is made of at least one metal selected from the group consisting of steel, iron, aluminum, titanium, nickel, and carbon steel.

5. The device of claim 1, wherein the specimen metal table has a flat rectangular depression at a front surface facing the handpiece section.

6. The device of claim 5, wherein the flat rectangular depression has a length and a width of from 2 millimeters (mm) to 20 mm and a depth of from 1 to 5 mm.

7. The device of claim 1, wherein the abrasion handpiece is rotatable 180 degrees through the aperture of the vertical arm relative to the specimen in the specimen metal table.

8. The device of claim 1, wherein the specimen metal table has a substantially square surface.

9. The device of claim 8, wherein an individual clamp locknut is disposed equidistant between adjacent corners of the square specimen metal table.

10. The device of claim 1, wherein the vertical arm is a hollow cylindrical body and the horizontal arm is a hollow cylindrical body.

11. The device of claim 10, wherein the vertical arm has a first outer diameter, and the horizontal arm has a second outer diameter different from the first outer diameter.

12. The device of claim 11, wherein the first outer diameter is less than the second outer diameter.

13. The device of claim 11, wherein the second outer diameter is 1.1 to 1.3 times greater than the first outer diameter.

14. The device of claim 11, wherein the first outer diameter is 1.1 to 1.3 times greater than the outer second diameter.

15. The device of claim 1, wherein the platform is made of steel.

16. The device of claim 1, wherein the specimen metal table is made of at least one metal selected from the group consisting of steel, iron, aluminum, titanium, nickel, and carbon steel.

17. The device of claim 1, wherein the platform is rectangular.

18. The device of claim 1, wherein the specimen section includes at least 4 clamp locknuts.

* * * * *